June 4, 1935. C. E. REED 2,004,013
ANTIFRICTION BEARING ASSEMBLY FOR DRILLS
Filed July 11, 1934

Clarence E Reed
INVENTOR

Patented June 4, 1935

2,004,013

UNITED STATES PATENT OFFICE 2,004,013

ANTIFRICTION BEARING ASSEMBLY FOR DRILLS

Clarence E. Reed, Wichita, Kans.

Application July 11, 1934, Serial No. 734,662

5 Claims. (Cl. 255—71)

The invention relates to an anti-friction bearing assembly, and concerns particularly the employment in the same raceway of anti-friction balls and anti-friction rollers interspersed relative to each other in said raceway.

The invention is disclosed in connection with a roller cutter assembly for earth boring drills, the balls being arranged to take end thrusts, or, in other words, thrusts imposed in the general direction parallel with the axis of revolution about the spindle, and said anti-friction rollers taking thrusts which are radial to the axis of the spindle upon which the roller cutter rotates.

The invention is shown in the accompanying drawing, in which

Figures 1, 2, 3:
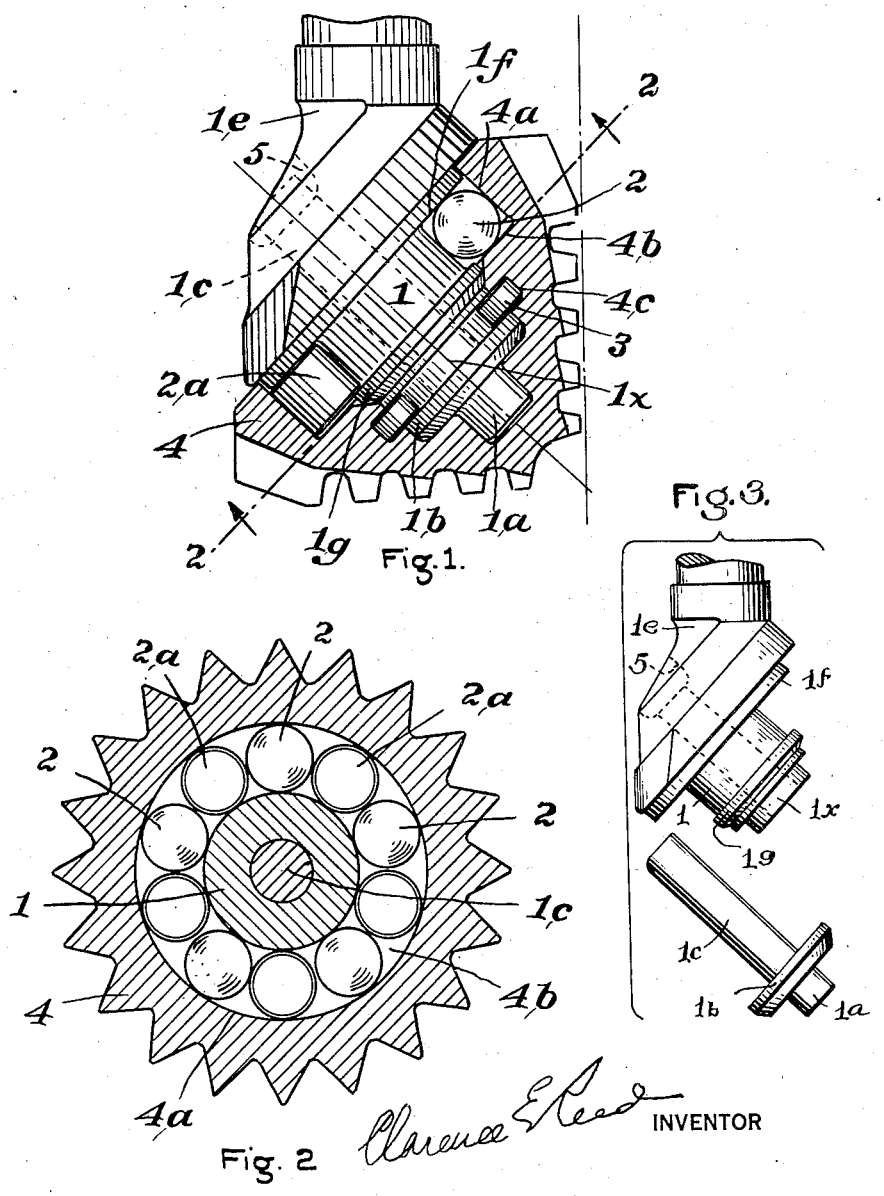
Figure 1 shows a roller cutter of an earth boring drill which cutter is in section with the spindle and anti-friction bearings and the spindle support in side elevation.
Figure 2 is a sectional view substantially on the line 2—2 of Figure 1.
Fig. 3 is a view of the spindle with its parts in disassembled relation.

In the drawing, 1 indicates the main part of the spindle; 2 comparatively large diameter anti-friction balls adapted to roll on the cylindrical surface of the spindle. 4 indicates a roller cutter having a toothed periphery for cutting the earth formation. This cutter, as an illustration of one application of the invention, is of general frusto-conical form. It has a runway for the balls in its enlarged bore at the base portion thereof, said runway presenting a substantially cylindrical surface 4a, and also a wall 4b substantially at right angles to the cylindrical surface 4a. The balls 2 contact these walls 4a, 4b and also contact the surface 1f of the base of the spindle from which base the shank 1e extends to be affixed into the bit head. Alternating with the balls 2 are the anti-friction rollers 2a. These roll on the cylindrical surface of the spindle 1, and they contact with their peripheries the track or wall 4a of the raceway in which the balls 2 are located. These cylindrical anti-friction rollers 2a are of slightly less length than the diameters of the balls 2, so that the balls take the end thrusts in the direction parallel with the axis of the spindle 1, and the anti-friction rollers therefore are not subjected to this end thrust, their function being to take thrusts which are radial in respect to the axis of the spindle.

This arrangement distributes the radial loads over a comparatively large surface area, because, as above stated, the anti-friction rollers bear with their peripheries upon the spindle 1, and also upon the track surface 4a of the raceway in the cutter, or other member to be rotatively supported.

The balls act as spacers for the anti-friction rollers, and do not carry radial loads to any great extent. They do take the end thrusts. While the anti-friction rollers and balls are shown as of substantially the same diameter, the invention is not limited in this respect, as in some situations the balls may be of slightly greater diameter than the anti-friction rollers.

These anti-friction members consisting of the balls and the interspersed anti-friction rollers, as above described, take the end thrusts and the radial thrusts respectively, and for holding the roller cutter, or other member on the spindle, I have provided retaining discs or rollers 3 arranged in a raceway 4c of the cutter. Complementary to this raceway 4c there is a raceway in the spindle partly receiving the retaining rollers 3. The spindle is formed in two sections, namely, the main section 1, and a terminal section made up of the flange 1b and reduced centering end 1a. These parts are integral with each other and also they are integral with a stem portion 1c shown in dotted lines which extends through a bore in the main spindle portion 1, and the base of the spindle, the said stem being united to said base at 5 by welding. The main portion of the spindle has a reduced part 1x integrally formed therewith which provides the inner wall of the raceway complementary to the raceway 4c of the cutter. There is also a flange 1g formed integrally with the main part of the spindle 1, the side face of which flange lies adjacent the end face of the roller bearings 2a.

In assembling the parts, the terminal section of the spindle would first be inserted in the roller cutter so that the side face of the flange 1b will coincide with that wall of the raceway 4c in the cutter which lies nearest the apex of the cutter. The roller retaining members 3 will then be inserted into place, there being sufficient space between the stem 1c and the wall of the bore of the cutter to permit the rollers 3 to be moved down into place in line with the raceway 4c, and thereafter to be moved radially outward into said raceway. After this action has been performed, the main part of the spindle with the anti-friction balls and rollers are assembled into place, in which action the reduced portion 1x of the main part of the spindle will fit within the circle of anti-friction rollers 3, and afford a bottom of the raceway therefor.

By uniting the stem 1c with the shank member or base of the spindle, the union becomes complete. It will be noticed that the raceway for the balls and rollers at the base or large end of the cone cutter is formed as a shallow groove having parallel side walls. The rollers will be held by these walls against tendency to pivot.

While the invention is particularly designed for use in connection with roller cutter and spindle assemblies for earth boring drills, it is not limited in this respect.

I claim:

1. In combination in a roller cutter and spindle assembly for earth boring drills a spindle formed of two sections, the main section of which has a raceway and the terminal section of which spindle has a raceway between itself and the main section, a roller cutter mounted on the spindle having a raceway engaged by anti-friction locking means which also engage the raceway between the sections, means for holding the sections of the spindle together, said roller cutter having a bore open at one side thereof, anti-friction balls and anti-friction rollers arranged in alternation in the said bore of the roller cutter, and a base plate confining the balls and rollers in said bore and adapted to take end thrusts from the balls, substantially as described.

2. In combination a spindle having an annular flange, a roller cutter mounted on said spindle having an open bore at one end, anti-friction balls and rollers arranged in said bore in alternation and bearing upon the spindle, said spindle having a base to take end thrusts of the balls, and to confine the roller bearings in the said bore, and between itself and the flange on the spindle, substantially as described.

3. As an article of manufacture, a spindle and support for a roller cutter of an earth boring drill, said spindle including a main section having a groove and a stepped free end forming bearing surfaces, and a terminal section having a flange and attached to the main section.

4. As an article of manufacture, a spindle and support for a roller cutter of an earth boring drill, said spindle comprising a main section integral with said support, a raceway on said section, a flange on said section, a portion of another raceway on said section, and a detachable end section having a complementary part of said other raceway.

5. An article of manufacture according to claim 3 in which said terminal section has a friction bearing area for receiving lateral thrusts of a roller cutter.

CLARENCE E. REED.